H. AUCHU.
MACHINE FOR MIXING EXPLOSIVES.
APPLICATION FILED OCT. 5, 1907.
902,465.
Patented Oct. 27, 1908.
3 SHEETS—SHEET 2.
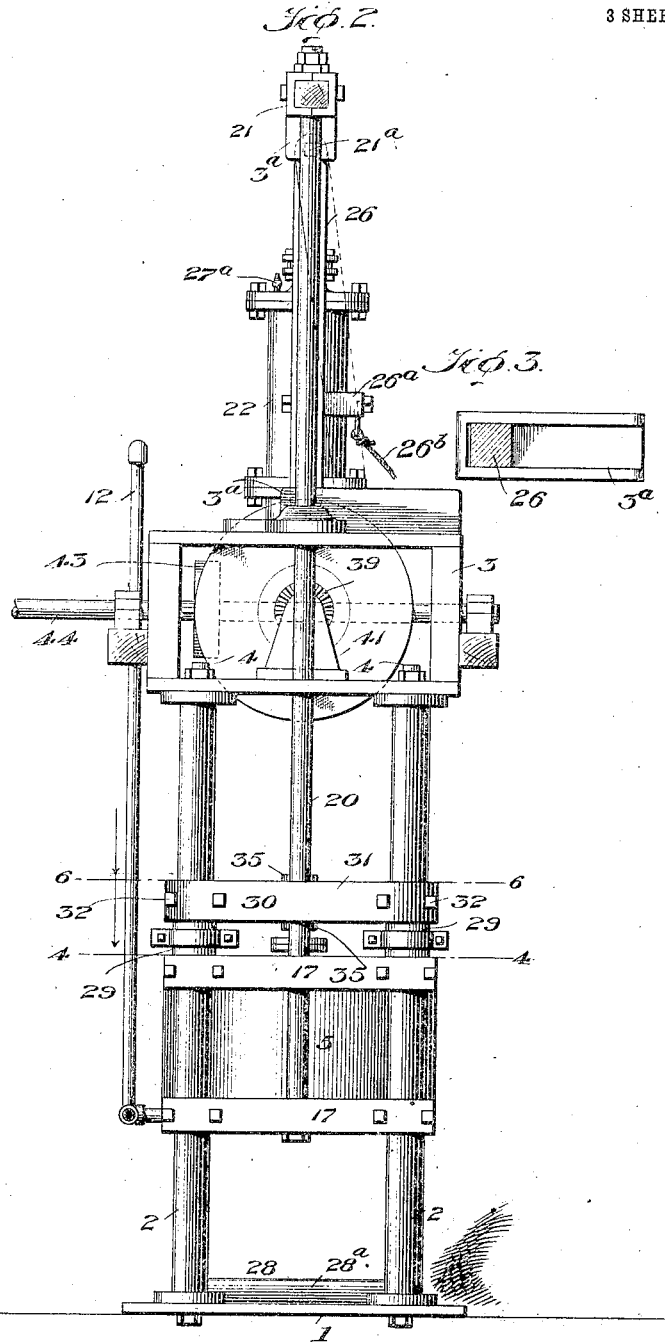

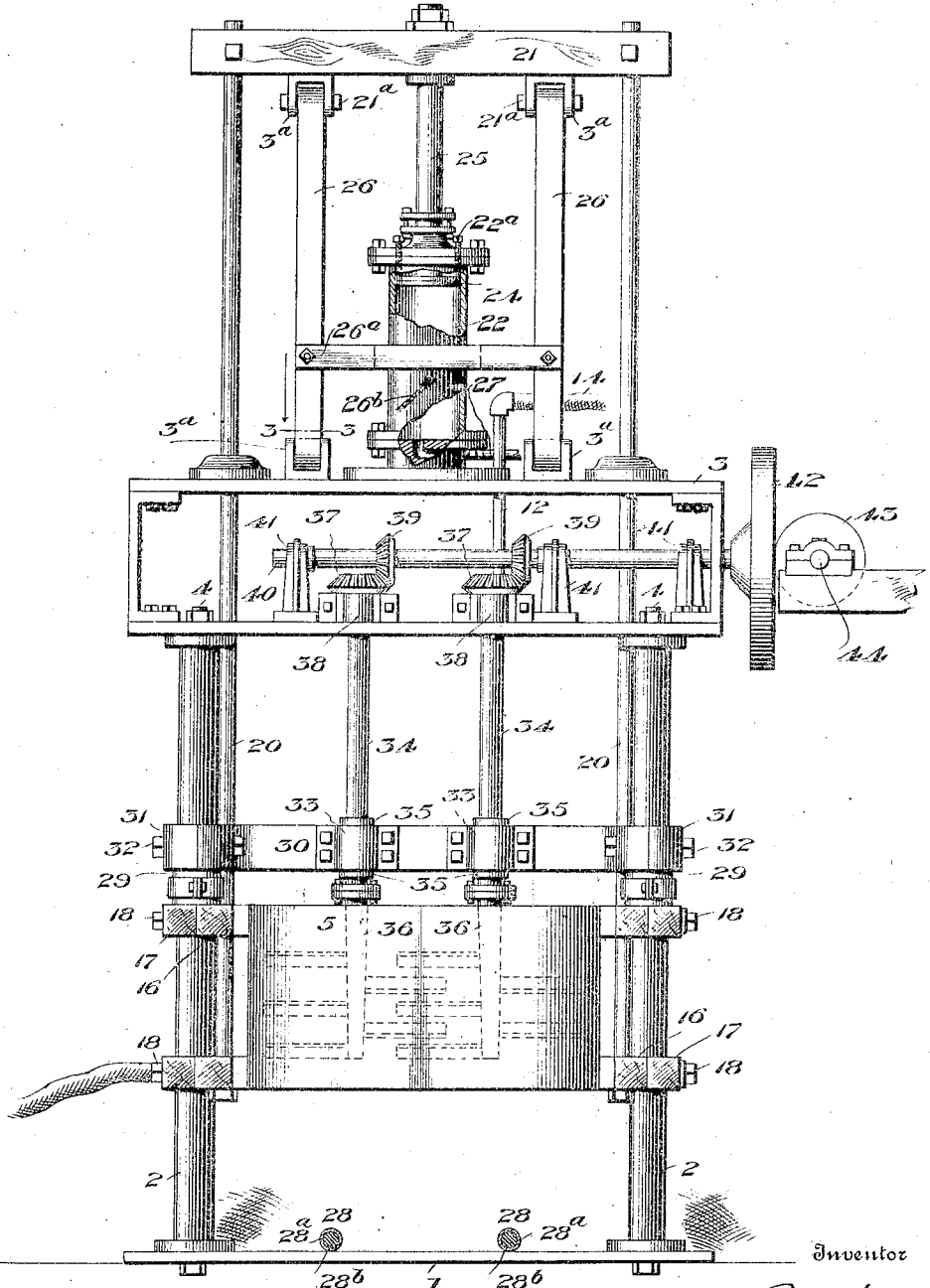

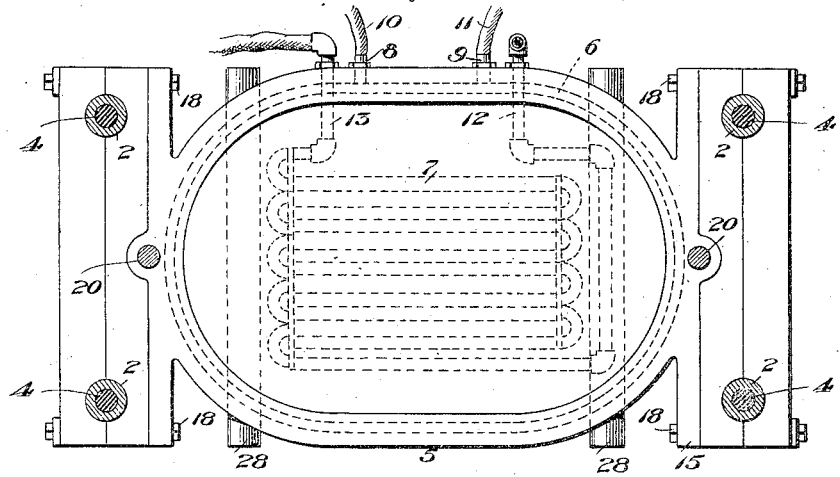
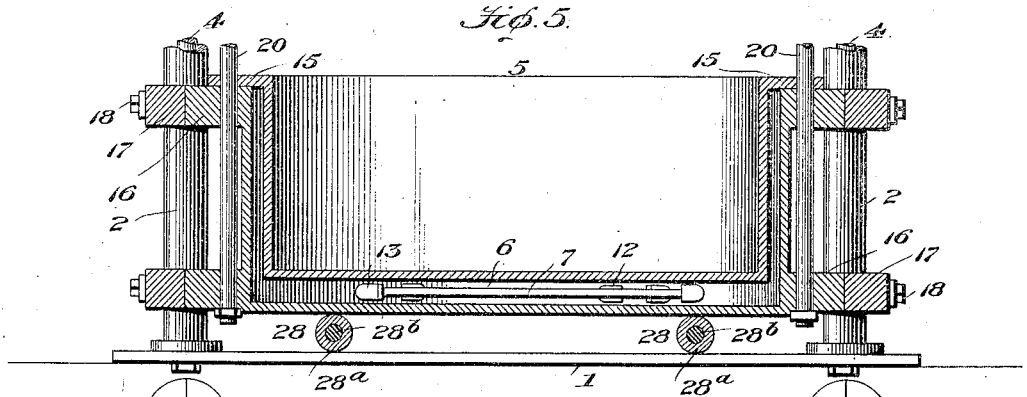
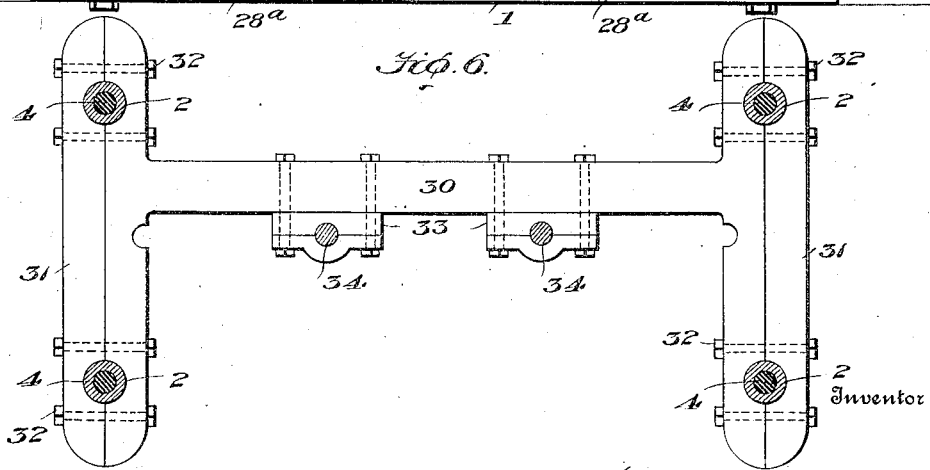

UNITED STATES PATENT OFFICE.

HENRY AUCHU, OF EMPORIUM, PENNSYLVANIA.

MACHINE FOR MIXING EXPLOSIVES.

No. 902,465.  Specification of Letters Patent.  Patented Oct. 27, 1908.

Application filed October 5, 1907. Serial No. 396,109.

*To all whom it may concern:*

Be it known that I, HENRY AUCHU, a citizen of the United States, residing at Emporium, county of Cameron, and State of Pennsylvania, have invented certain new and useful Improvements in Machines for Mixing Explosives, of which the following is a specification.

My invention relates to machines for mixing explosives.

The operation of mixing the ingredients of high explosives is very dangerous and has to be conducted with extreme care and for this reason is frequently carried on by hand, but as hand mixing is slow and laborious, machines have heretofore been employed for such purposes, my invention relating to this class of machine.

Heretofore it has been proposed to provide a machine for mixing explosives employing a stationary mixing bowl or tub, rotary stirrers or mixers adapted to operate therein, and some means for raising the stirrers or mixers from the bowl or receptacle at desirable times or to lower them into it but as such constructions involve considerable mechanism, these machines have been expensive to manufacture beside possessing the disadvantage of necessitating the attendant stooping over the bowl or mixing tub while watching the mixing operation, causing inconvenience, while the slidable parts of the mechanism increase the opportunity of some of the explosive liquid being caught and exploded.

My invention seeks to obviate defects heretofore incident to machines for mixing explosives such as enumerated and to provide an explosive mixer of comparatively few parts, safe in operation, easily controlled, which will enable the attendant to watch the mixing action without stooping over the bowl, and capable of manufacture at considerably less expense than possible with those machines heretofore known to the art.

Instead of employing a stationary receptacle and having the mixing devices adapted for raising from or lowering into the bowl as heretofore proposed, I carry out my invention by having the mixing means relatively stationary and raise and lower the bowl to cause the mixers to be positioned therewithin or exposed there above. Thus, when the bowl or tub is raised and the mixing operation going on, the bowl or tub is at the proper height so that the attendant can readily observe the operation without having to stoop over, which avoids inconvenience besides insuring proper control and whereby the construction is greatly simplified and the operation enabled to be carried on more satisfactorily and expeditiously. In carrying out the invention, compressed air operated mechanism of novel construction is employed for raising and lowering the mixing bowl or receptacle and other novel constructions are employed which I set forth fully hereinafter and recite in the appended claims.

In the accompanying drawings:—Figure 1 is a front elevation showing the bowl raised and sustained, as when the machine is in operation; Fig 2, an end elevation, dotted lines representing the supports released so that the bowl may be lowered; Fig. 3, a detail section on line 3—3 of Fig. 1; Fig. 4, a section on line 4—4 of Fig. 2; Fig. 5, a vertical section through the mixing bowl; and Fig. 6, a section on line 6—6 of Fig. 2.

The machine is supported by a metal base 1 which may have a suitable foundation and from which rise four hollow pillars 2 which sustain a frame-work 3, tie-rods 4 running through the piece 1, pillars 2 and framework 3 and rigidly tying the whole structure together.

The mixing bowl or tub 5 is of elliptical form, being provided with a water space 6 surrounding it and extending beneath it in a well known manner, while in the space under the mixing bowl there is located a steam coil 7 for heating the water whereby the contents of the bowl are kept at the proper temperature. The water space 6 has a water inlet 8 and an outlet 9 which are connected to flexible hose sections 10 and 11 respectively. Similarly, the coil 7 has the steam inlet 12 and an outlet or exhaust 13. The exhaust 13 may deliver the steam to any point. The inlet 12 extends upwardly and is connected to a flexible hose 14 receiving steam from any suitable source.

Secured to the laterally extending end-pieces 15 of the bowl 5 are wooden guides 16 and 17, bolts 18 being employed for this purpose. The guides 16 and 17 have semicircular matching holes which receive the pillar or columns 2. Wood is used to prevent heating from friction as the guides slide up and down on the pillars 2. The bolts 18 provide means for adjusting the guides 16 and 17 with any desired degree of closeness of fit against the pillars 2.

Extending through openings in the end-pieces 15 are vertical rods 20, suitably secured to the said end-pieces which pass upwardly through the frame 3 and are connected by a cross-head 21 composed of channel beams with wood filling. Mounted upon frame 3 is the air cylinder 22 the supply of compressed air from any suitable source 27 to and its exhaust from which is controlled by a three-way valve mechanism operated by the attendant. A piston 24 and rod 25 connected to the cross-head 21 constitute means whereby the mixing bowl may be raised and lowered at will.

To retain the mixing bowl in its raised position, as an extra precaution, there are provided sustaining devices 26 which are pivoted to the cross-head at $21^a$, and are connected by a yoke $26^a$ which is controlled by a rope $26^b$. These devices 26 drop by gravity into engagement with the stops $3^a$ to support said cross-head when it has reached the proper height and are released therefrom by pulling on the rope. The air in the cylinder 22 above the piston 24 is allowed to escape through pet cock $27^a$ as the piston rises. Adjustable screws $22^a$ limit the upward play of the piston and prevent contact of the mixers with the bottom of the mixing bowl.

Extending cross-wise in relation to the bowl 5 and resting upon the base 1 are the bumpers or cushions 28 composed of rubber hose $28^a$ having a central filling of wood $28^b$. I find that a cylindrical buffer or bumper presenting only a slight superficial area for the bowl to rest upon is much safer than a flat buffer for the reason that the explosive has no opportunity of being confined between the buffer and bowl and squeezed so that it will explode should it get in that position, the cylindrical surfaces of the buffers permitting it to drain off.

Secured to the pillars 2 are adjustable bumpers or buffers 29 which are positioned at the height to which it is desired the bowl 5 shall be raised.

Above the buffer 29 is a frame 30 supporting the mixer shafts, said frame being made in a single casting except the outer clamping pieces 31 which are secured to the frame by the bolts 32 whereby it is readily clamped to the pillars 2 and remains so at all times. Detachable journal boxes 33 are provided for the mixer shafts 34 which have collars 35 above and below the boxes 33 to prevent endwise movement of said shafts. The mixers 36 are detachably connected to the shafts 34 and are of a paddled or bladed construction, the blades having their faces inclined and those of one mixer interacting with those of the other mixer. However, different forms of mixers may be employed if desired. Key seated and rigidly connected by pins to the upper ends of the shaft 34 are bevel gears 37 supported on journal boxes 38 and meshing with beveled gears 39 carried by a shaft 40 journaled in boxes 41 on frame 3. The shaft 40 carries a friction-wheel 42 is driven by a corresponding wheel 43 loosely splined on a shaft 44 so that it may be slid to any position crosswise of wheel 42 to drive the latter faster or slower or reverse the rotation thereof so that the mixers after having been rotated a given time in one direction, may be reversed, a practice which is very beneficial in carrying out the mixing operation.

It being understood that the mixers and their shafts are incapable of up and down play and are not intended for such movement, the mixing operation will be carried on by raising the bowl 5 to cause submergence of the mixers in the liquid explosive in said bowl. In this position the bowl is at such a height that the attendant can readily observe the mixing operation and control the machine accordingly without inconvenience or having to stoop over as is the case with mixing machines now known to the art. When the mixing operation is completed the bowl is lowered and the contents taken off. When so lowered access can be had to the mixers.

Having thus described my invention, what I claim as new and desire to secure by Letters Patent, is:—

1. In a machine for mixing explosives, the combination with pillars, of a mixing bowl or receptacle adapted to be raised and lowered which is guided by said pillars, mixing means sustained stationarily by the pillars, a motive fluid cylinder, having a piston and piston rod, and a rod connected to the bowl or receptacle and to the piston whereby the bowl or receptacle may be raised or lowered by the play of the piston under the influence of a motive fluid to thereby cause the mixing means to be positioned within the bowl or freed therefrom.

2. In a machine for mixing explosives the combination with a mixing bowl or receptacle adapted to be raised or lowered, of mixing means adapted for operation in the bowl or receptacle, means for raising or lowering the mixing bowl or receptacle and normally inactive means automatically acting when the mixing bowl has reached a predetermined height which secure it in raised position.

3. In a machine for mixing explosives, the combination with a mixing bowl or receptacle adapted to be raised or lowered, of mixing means adapted for operation in said bowl or receptacle, motive fluid operated means for raising and lowering the mixing bowl or receptacle, and means for securing the bowl or receptacle in raised position independent of the motive fluid operated means.

4. In a machine for mixing explosives, the combination with a mixing bowl or receptacle adapted to be raised or lowered, of mixing means adapted for operation in said bowl or receptacle, motive fluid operated means for raising and lowering the mixing bowl or receptacle, and normally inactive means independent of the motive fluid operated means adapted for automatically acting to secure the bowl or receptacle in raised position when said bowl reaches a predetermined height.

5. In a machine for mixing explosives, the combination with a mixing bowl or receptacle adapted to be raised or lowered, of cylindrical bumpers or buffers for said mixing bowl or receptacle which are disposed horizontally so that they may serve as stops for said bowl.

6. In a machine for mixing explosives, the combination with a mixing bowl or receptacle adapted to be raised or lowered, of tubular cylindrical bumpers or buffers having a filling which are disposed crosswise of the mixing bowl or receptacle and adapted to be engaged thereby.

7. In a machine for mixing explosives, the combination with a mixing bowl or receptacle adapted to be raised or lowered, of mixing means adapted for operation in the bowl or receptacle, means for raising or lowering the mixing bowl or receptacle, and hinged props or supports which are normally inactive and automatically act when the mixing bowl has reached a predetermined height to secure it in raised position.

8. In a machine for mixing explosives, the combination with a mixing bowl or receptacle adapted to be raised or lowered, of mixing means adapted for operation in said bowl or receptacle, motive fluid operated means for raising and lowering the mixing bowl or receptacle, and hinged props or supports which are normally inactive and automatically act when the mixing bowl has reached a predetermined height to secure it in raised position.

In testimony whereof, I hereunto affix my signature in presence of two witnesses.

HENRY AUCHU.

Witnesses:
W. S. SWARTWOOD,
H. A. COX.